United States Patent [19]

Baumgarten

[11] 3,712,773

[45] Jan. 23, 1973

[54] DEVICE FOR FEEDING PLASTIC RUBBER OR SYNTHETIC RUBBER MIXTURES TO PROCESSING MACHINES

[75] Inventor: Wilfried Baumgarten, 3011 Pattensen, Germany

[73] Assignee: Continental Gummi-Werke Aktiengesellschaft, Hannover, Germany

[22] Filed: Dec. 8, 1970

[21] Appl. No.: 96,086

[30] Foreign Application Priority Data

Dec. 9, 1969 Germany ................... P 19 61 632.1

[52] U.S. Cl. .................... 425/142, 83/61, 425/376
[51] Int. Cl. ............................................. B78b 17/00
[58] Field of Search .......... 18/2 HA, 2 S, 12 SH, 4 S; 83/61; 425/142, 376

[56] References Cited

UNITED STATES PATENTS

| | | | |
|---|---|---|---|
| 3,036,335 | 5/1962 | Heston et al. | 18/12 SH UX |
| 3,183,748 | 5/1965 | Wilshin et al. | 83/61 |
| 2,383,989 | 9/1945 | Pilcher | 18/4 S |
| 3,110,420 | 11/1963 | Brewer | 18/12 SH UX |
| 3,354,501 | 5/1967 | Bachman et al. | 18/2 HA |

Primary Examiner—H. A. Kilby, Jr.
Attorney—Walter Becker

[57] ABSTRACT

In combination with a processing machine, an apparatus in which a strip of natural or synthetic rubber material is fed at intervals into the charging funnel of the processing machine in conformity with the state of filling of the charging funnel, and in which between said feeding intervals a section of the strip of rubber material adjacent said charging funnel is cut off.

3 Claims, 2 Drawing Figures

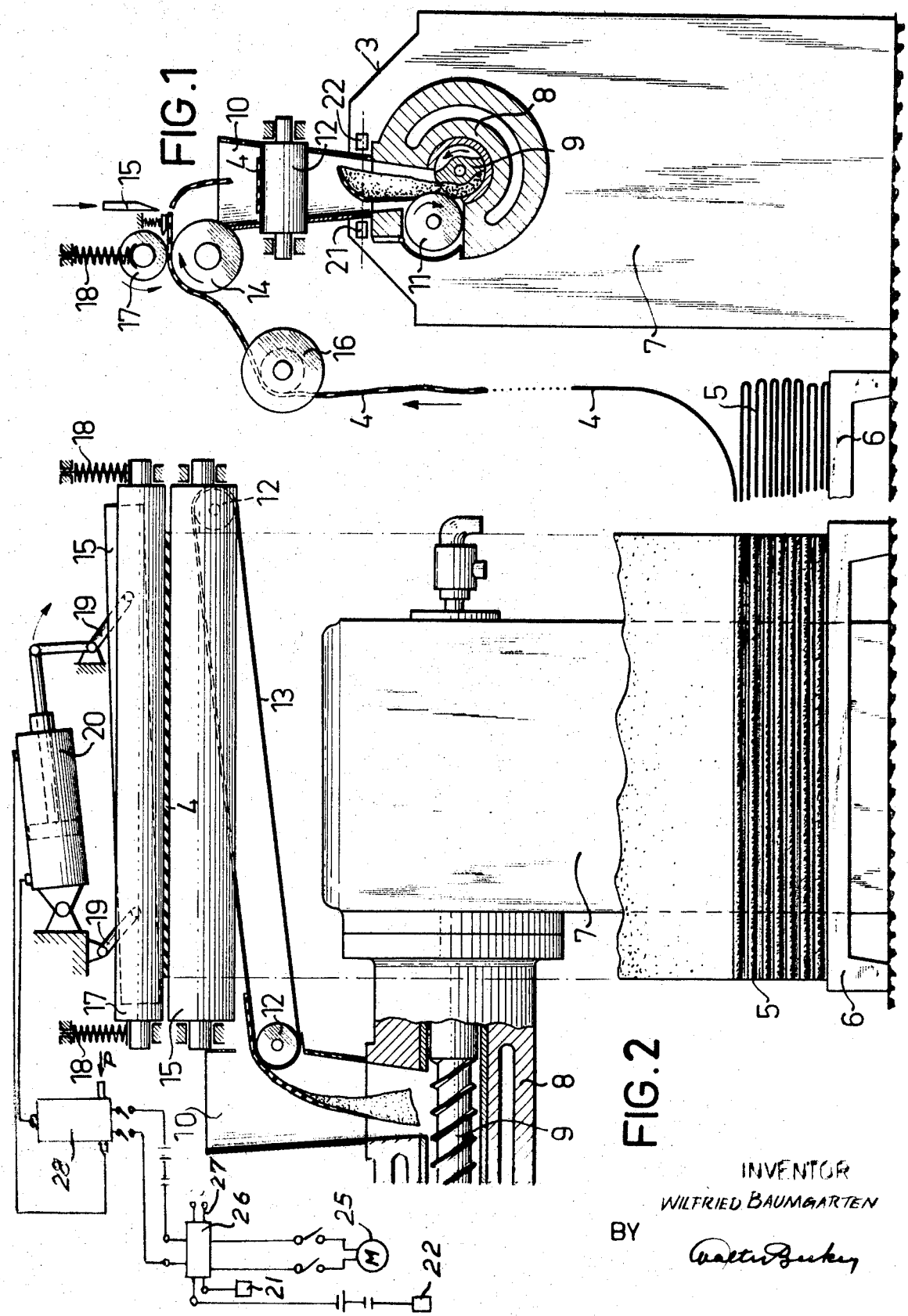

DEVICE FOR FEEDING PLASTIC RUBBER OR SYNTHETIC RUBBER MIXTURES TO PROCESSING MACHINES

The present invention relates to an apparatus for feeding raw plastic natural and synthetic rubber mixtures in the form of a coherent strip into the charging funnel of extrusion presses or other processing machines. A frequently employed and highly satisfactory method of feeding such mixtures is based on the employment of granulates or pellets inasmuch as in this way when employing weighing or dosing devices, it is possible to adapt the operation to the varying discharge of the respective pertaining processing machine. Due to the required special granulating and pellet preparing devices, methods employing granulates and pellets therefore necessitate higher investment and operating costs.

According to another heretofore known method, the oncoming strips of rubber material are formed into small zig-zag-shaped bands by cutting the strips alternately from both sides, and these zig-zag-shaped bands will, in view of their increased expandability in their longitudinal direction during a continuous feeding to the processing machine, permit the adaptation of the feeding operation within certain limits to the varying discharge or extrusion output. Aside from the relatively high price of the required zig-zag cutting device, the possibility of employment of this known method is limited to special instances with fixed condition of operation. A further drawback of the last mentioned method consists in that only strips of raw rubber mixtures with smoothly cut lateral edges are suitable.

It is, therefore, an object of the present invention to provide a feeding or charging system for feeding raw plastic natural and synthetic rubber mixtures into processing machines, which is applicable practically for any universal feeding width without any limiting conditions and which will neither require any major structure which might affect the economy of the process nor any major investment costs.

This object and other objects and advantages of the invention will appear more clearly from the following specification in connection with the accompanying drawings, in which:

FIG. 1 illustrates a side view of an apparatus according to the present invention with an extrusion press.

FIG. 2 is a front view of the apparatus according to FIG. 1.

The apparatus according to the present invention is characterized primarily by conveying means adapted to be driven in conformity with the filling condition of the processing machine and receiving the strip of raw rubber mixture, and is furthermore characterized by a cutting knife for cutting the strip of raw rubber mixture, said knife being movable between the conveying means and the charging funnel.

According to a preferred embodiment of the invention, the conveying means comprises a transport roller over a portion of which the strip of the raw rubber mixture is looped. The transport roller is adapted to be driven intermittently and has associated therewith a pressure roller for pressing the strip against the circumference of the transport roller. The pressure roller is displaceable, for instance, by the thrust of a spring, by gravity or by a fluid pressure cylinder piston system.

Referring now to the drawings in detail, the apparatus shown therein serves in the illustrated arrangement for feeding end portions of strip 4 of a raw rubber mixture into an extrusion press 3. These strips 4 form a continuous coherent fleece which is alternately back and forth folded condition is in the form of a pile kept in readiness on a support 6 adjacent the extrusion press. The extrusion press 3 may be of any standard type with a motor transmission block 7 and a rotatable worm 9 which plasticizes the charged raw mixture within a housing 8 provided with a heating or cooling jacket. The worm 9 advances the charged raw mixture in the direction toward the non-illustrated mouthpiece of the extrusion press. The raw mixture is conveyed to the worm through a charging funnel 10 which is located at the rear end of the housing 8 which faces away from the mouthpiece. During the rotation of the worm 9, the raw mixture is drawn inwardly and is intermixed with the content of the press while being subjected to increasing heating. For purposes of supporting and aiding this drawing-in effect of the worm 9, a feeding roller 11 may be provided which is driven in a direction opposite to the driving direction of the worm 9 and is located within the region of operation of the worm 9. Roller 11 forms together with the worm 9 a roller gap or bite similar to the bite between the rollers of a mixing roller set. The charging funnel 10 may be charged directly or through the intervention of an additional conveying device, for instance, a roller conveyor or, in conformity with the illustrated embodiment, through the intervention of an endless conveyor belt 13 passed over reversing rollers 12. The direct charging of the relatively narrow charging funnel is suitable for the processing of wide mixture fleeces and in general for the feeding of raw mixture strips having greatly varying widths.

The illustrated charging device comprises as primary components a transport roller 14 and a cutting knife 15 following the latter. The roller 14 is in stationary bearings so journalled in the intake range of the charging funnel 10 that it will grasp the raw mixture strip passing over a guiding roller 16 on the upper roller circumferential section and feed the strip over and past the upper edge of the funnel into the same. The frictional engagement of the strip with the transport roller 14 is assured by a spring-loaded pressing roller 17 which is freely rotatably journalled and is radially displaceable toward the transport roller 14. The cutting knife 15 is designed as rigid impact knife having a length which corresponds approximately to the width of the rollers 14, 17. The knife 15 is suspended in the manner of a pendulum on lever-shaped links 19 and can be so tilted by a double-acting pressure fluid operable cylinder piston system 20 that it will simultaneously with the downward movement indicated in FIG. 1 by an arrow carry out a transverse movement parallel to the axial direction of the transport roller 14. Consequently, strip 4 is cut by means of pulling cuts which result in a saving of power and in smooth cutting surfaces. The alternate supply of pressure fluid to both chambers of the cylinder piston system 20 is controlled by a non-illustrated electromagnetic valve the exciting coil of which is so interposed in the circuit of the driving motor for the transport roller 14 that only an alternating actuation of the transport roller on one hand and of the cutting knife on the other hand will be possible.

For the initiating pulse of the driving mechanism, the charging funnel 10 of the extrusion press 3 is according to the illustrated embodiment provided with photoelectrically scanned optically transparent perforations. At an adjustable height and in the region of the normal filling level at both sides of the perforations there is provided a photoelectric cell 21 with a pertaining light source 22 which blocks the passage of the current as long as raw mixture is located within the optically checked zone, and only when the light can pass through freely, closes the driving circuit. In a similar manner it would be possible instead to employ a mechanical feeler mechanism adapted to actuate electric contacts.

The operation is as follows. The raw mixture strip 4 which is stored on the support 6 adjacent the extrusion press is in steps or section by section pulled forward by the intermittently driven transport roller 14. After each completed working cycle, a section or end portion of the strip the length of which may be varied will behind the following cutting knife extend into the region of the charging funnel 10 or the associated conveyor 12, 13. During this feeding of the material, the cutting knife occupies its illustrated rest position. As soon as the previously charged strip section or end portion has been completely pulled into the extrusion press 3 and accordingly light can pass through the control section or end portion of the charging funnel, the photoelectric cell initiates the driving pulse for the actuating cylinder piston system 20 of the cutting knife 15 so that the latter moves downwardly, cuts off the next following strip section and directly thereafter returns to its rest position. by means of a limit switch or other suitable control means, subsequently the drive motor for the transport roller 14 is turned on and the strip 4 is advanced by a further section below the cutting knife. The apparatus is therefore ready to follow up with a new supply of material while the previously charged strip section has not yet completely passed through the intake zone.

As will be evident from the above, the apparatus according to the present invention requires relatively low investment costs and furthermore permits a completely automatic operation without a continuous manual intervention. The operator therefore can devote his attention simultaneously to a plurality of devices in operation. Both factors increase the economy of the apparatus far beyond that of heretofore known systems. In addition thereto, the possibility of application of the apparatus according to the present invention is not bound to a certain condition or property of the raw mixture strip to be processed. The lateral edges need not be cut smoothly, and also varying widths of the strip will not affect the working operation. The cutting knife which advantageously is actuated alternately with the transport roller is provided for completely cutting through the strip and therefore can be designed in a simple cost-saving manner.

While the apparatus according to the invention has been designed primarily for use in connection with extrusion presses, it is by no means limited thereto but may also advantageously be employed in connection with the charging of other rubber or synthetic material processing machines. The furnished raw mixture strips may be withdrawn from rotatably supported cops or rollers or the like or may be withdrawn from piles containing the strips in alternately folded layers. The control pulses for turning on the drive motor of the transport roller may be derived from standard control devices which photoelectrically or mechanically or in any other suitable manner feel or scan the condition of filling of the charging funnel. The advance or feeding of the cut-off strip section within the intake range of the processing machine may be aided by feeding rollers and/or by fluid pressure operable tamping members.

With regard to FIG. 2, there may be added that this figure also shows a photoelectrically controlled circuit according to which the pressure fluid cylinder piston system 20 for the cutting knife 15 is through the intervention of a magnetic valve 28 provided with air under pressure at P while the magnetic valve is electrically controlled by a relay 26. Relay 26 is adapted on one hand to establish the control circuit for the magnetic valve 28 and on the other hand is adapted to establish the circuit for the working current 27 for the drive motor 25 of the transport roller 14. The drive motor 25 in its turn is controlled by a photoelectric cell 21, 22.

It is, of course, to be understood that the present invention is, by no means, limited to the particular showing in the drawings but also comprises any modifications within the scope of the appended claims.

What I claim is:

1. In combination with an extrusion press having a charge inlet, strip feeding means for feeding a strip of a rubber material, cutting means to sever end portions of said strip successively after being fed by said feeding means, means to direct said end portions successively to said charge inlet, control means to operate and stop said feeding means and to operate said cutting means when said feeding means is stopped, and a sensing device in said charge inlet to actuate said control means to stop said feeding device and operate said cutting means in the absence of an end portion in said charge inlet, and to operate said feeding means when an end portion is passing through said charge inlet.

2. In the combination claimed in claim 1, said extrusion press having means for heating the material in the press.

3. In the combination claimed in claim 1, in which said cutting means comprises a knife movable transversely across the width of said strip of rubber material.

* * * * *